US010900794B2

(12) United States Patent
Napier (10) Patent No.: US 10,900,794 B2
(45) Date of Patent: Jan. 26, 2021

(54) SYSTEM AND METHODS FOR MODIFYING ROUTE NAVIGATION WITH WAYPOINTS

(71) Applicant: Honda Motor Co., Ltd., Tokyo (JP)

(72) Inventor: Parhys L. Napier, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 241 days.

(21) Appl. No.: 15/683,320

(22) Filed: Aug. 22, 2017

(65) Prior Publication Data
US 2019/0063934 A1    Feb. 28, 2019

(51) Int. Cl.
*G01C 21/34* (2006.01)
*G01C 21/36* (2006.01)
*G08G 1/0969* (2006.01)

(52) U.S. Cl.
CPC ....... *G01C 21/343* (2013.01); *G01C 21/3614* (2013.01); *G01C 21/3652* (2013.01); *G01C 21/3664* (2013.01); *G08G 1/0969* (2013.01)

(58) Field of Classification Search
CPC . G01C 21/343; G01C 21/3614; G08G 1/0969
See application file for complete search history.

(56) References Cited

U.S. PATENT DOCUMENTS

| | | | |
|---|---|---|---|
| 5,928,307 A | 7/1999 | Oshizawa et al. | |
| 6,401,034 B1 | 6/2002 | Kaplan et al. | |
| 6,456,934 B1 | 9/2002 | Matsunaga et al. | |
| 7,103,474 B1 | 9/2006 | Asahara et al. | |
| 7,349,800 B2 | 3/2008 | Forlenza et al. | |
| 7,640,104 B2 | 12/2009 | Ramaswamy et al. | |
| 7,873,471 B2 | 1/2011 | Gieseke | |
| 9,195,633 B2 * | 11/2015 | Enami | B60K 37/06 |
| 9,200,916 B2 | 12/2015 | Yoshida | |
| 2007/0061068 A1 * | 3/2007 | Okamoto | G08G 1/096716 701/532 |
| 2007/0234226 A1 * | 10/2007 | Szeto | G06F 3/0486 715/769 |
| 2011/0083105 A1 * | 4/2011 | Shin | G06F 3/0485 715/830 |
| 2014/0019319 A1 * | 1/2014 | Derby | G06Q 10/0639 705/30 |
| 2014/0114565 A1 | 4/2014 | Aziz et al. | |
| 2014/0298253 A1 * | 10/2014 | Jin | G06F 3/04842 715/790 |
| 2015/0220216 A1 * | 8/2015 | Wigdor | G06F 3/0482 715/765 |

(Continued)

*Primary Examiner* — Jelani A Smith
*Assistant Examiner* — Alexander C. Bost
(74) *Attorney, Agent, or Firm* — Armstrong Teasdale LLP (57) ABSTRACT

A computer device for use in modifying route navigation with waypoints is provided. The computer device includes at least one processor in communication with at least one memory device. The computer device is in communication with at least one display screen and at least one touchpad. The computer device is programmed to (a) activate an edit mode from a route overview mode, (b) display a list of a plurality of destinations on a display screen, (c) detect a first touching and a first tapping on a touchpad in an area that corresponds to a destination of the plurality of destinations on the list to select the destination, (d) detect a second touching and a second tapping on the touchpad in an area that corresponds to a position in the list, and (e) move the destination to the position in the list.

18 Claims, 8 Drawing Sheets

(56) References Cited

U.S. PATENT DOCUMENTS

| | | | |
|---|---|---|---|
| 2015/0276423 A1 | 10/2015 | McIlhany et al. | |
| 2015/0293660 A1* | 10/2015 | Chiu | G06F 3/0488 715/769 |
| 2016/0169701 A1* | 6/2016 | Yang | G01C 21/3676 701/412 |
| 2016/0217113 A1* | 7/2016 | Bartle | G09B 5/00 |
| 2018/0023954 A1* | 1/2018 | Rivers | G01S 7/6272 701/21 |
| 2018/0260091 A1* | 9/2018 | Jung | G06F 3/0482 |
| 2019/0003842 A1* | 1/2019 | Kassner | G06Q 10/047 |

* cited by examiner

SYSTEM AND METHODS FOR MODIFYING ROUTE NAVIGATION WITH WAYPOINTS

BACKGROUND OF THE DISCLOSURE

The field of the disclosure relates generally to modifying route navigation with waypoints, and more specifically to methods and systems for use in controlling an infotainment system to modify a route with waypoints.

Generally, known route guidance system provide a user with travel directions between two or more points. Known route guidance systems may accept a user input of a starting point, an end point, and potentially one or more waypoints to travel to in between the starting point and the end points. Many of these known systems display the waypoints in order of travel. Some of these systems allow the user to change the order of the waypoints by dragging a selected waypoint to a new position in the order of travel. However, while a vehicle's driver is accessing these controls, the user is not focusing their attention on the road while actively driving. As such, a need exists to provide these route-guidance controls in a user-accessible manner that enables a user to quickly access desired controls while driving. This would reduce the amount of time that a user would need to spend to adjust the controls of the route guidance and then return their attention to actively driving.

BRIEF DESCRIPTION OF THE DISCLOSURE

In one aspect, a method for modifying route navigation with waypoints is provided. The method is implemented by a computer device that includes at least one processor in communication with at least one memory device. The method includes activating an edit mode from a route overview mode. The method also includes displaying a list of a plurality of destinations on a display screen. The method further includes detecting a first touching and a first tapping on a touchpad in an area that corresponds to a destination of the plurality of destinations on the list to select the destination. Moreover, the method includes detecting a second touching and a second tapping on the touchpad in an area that corresponds to a position in the list. In addition, the method includes moving the destination to the position in the list.

In another aspect, a computer device for modifying route navigation with waypoints is provided. The computer device includes at least one processor in communication with at least one memory device. The computer device is in communication with at least one display screen and at least one touchpad. The computer device is programmed to activate an edit mode from a route overview mode. The computer device is also programmed to display a list of a plurality of destinations on the display screen. The computer device is further programmed to detect a first touching and a first tapping on the touchpad in an area that corresponds to a destination of the plurality of destinations on the list to select the destination. Moreover, the computer device is programmed to detect a second touching and a second tapping on the touchpad in an area that corresponds to a position in the list. In addition, the computer device is programmed to move the destination to the position in the list.

In yet another aspect, a system for modifying route navigation with waypoints is provided. The system includes a touchpad including a first touch section and a second touch section and a display screen including a first display section and a second display section. The first display section corresponds to the first touch section and the second display section corresponds to the second touch section. The system also includes a computer device includes at least one processor in communication with at least one memory device. The computer device is in communication with the touchpad and the display screen. The computer device is programmed to activate an edit mode from a route overview mode. The computer device is also programmed to display a list of a plurality of destinations on a display screen. The computer device is further programmed to detect a first user input on the touchpad in an area that corresponds to a destination of the plurality of destinations on the list to select the destination. Moreover, the computer device is programmed to detect a second user input on the touchpad in an area that corresponds to a position in the list. In addition, the computer device is programmed to move the destination to the position in the list.

BRIEF DESCRIPTION OF THE DRAWINGS

FIGS. 1-5 illustrate exemplary embodiments of the methods and systems described herein.

DETAILED DESCRIPTION OF THE DISCLOSURE

The following detailed description illustrates exemplary embodiments by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. These system and methods are for use in controlling a navigation system through the use of touchpad.

The methods and system described herein may be implemented using computer programming or engineering techniques including computer software, firmware, hardware, or any combination or subset. As described above, at least one technical problem with known systems is a need to enable a user, such as a driver, to quickly make route adjustments through the infotainment system. The system and methods described herein address that technical problem. The technical effect of the systems and processes described herein is achieved by performing at least one of the following steps: (a) activating an edit mode from a route guidance mode; (b) displaying a list of a plurality of destinations on a display screen; (c) detecting a first touching and a first tapping on a touchpad in an area that corresponds to a destination of the plurality of destinations on the list to select the destination; (d) displaying a first indicator on the destination to indicate selection on the display screen; (e) detecting a second touching and a second tapping on the touchpad in an area that corresponds to a position in the list; (f) displaying a second indicator between two destinations to indicate the position on the list; (g) simultaneously displaying the first indicator and the second indicator; (h) moving the destination to the position in the list; and (i) displaying the first indicator after moving the destination to the position in the list. The resulting technical effect is that a user is able to more safely operate a route navigation system in a vehicle.

In some embodiments, the technical effect of the systems and processes described herein is achieved by performing at least one of the following steps: (a) displaying a portion of the list of the plurality of destinations; (b) displaying a scroll bar including an up arrow and a down arrow; (c) after detecting the first touching and the first tapping, detecting a user click on the touchpad in an area that corresponds to at least one of the up arrow and the down arrow; (d) displaying a new portion of the list of the plurality of destinations; and (e) detecting the second touching and the second tapping on the touchpad in an area that corresponds to the new portion. The resulting technical effect is that a user is able to more safely operate a route navigation system in a vehicle.

In some embodiments, the technical effect of the systems and processes described herein is achieved by performing at least one of the following steps: (a) displaying, on a first display section of the display screen, a route guidance mode including driving directions and an ETA area; (b) detecting a user input on the first touch section, wherein the touchpad includes a first touch section and a second touch section, and wherein the user input is a user click on the touchpad in an area corresponding to the ETA area of the route guidance mode; (c) activating a route overview mode based on the user input; (d) displaying, in the first display section, the route overview mode including the list of the plurality of destinations; (e) detecting a user hold input on the touchpad in an area that corresponds to the first touch section; and (f) activating the edit mode based on the user hold input. The resulting technical effect is that a user is able to more safely operate a route navigation system in a vehicle.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., systems, devices, processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "module", "system," or "unit," may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules, units, or systems shown in the attached figures may represent the hardware that operates based on software or hardwired instructions, the software that directs hardware to perform the operations, or a combination thereof.

In another embodiment, a computer program is provided, and the program is embodied on a computer-readable medium. In an exemplary embodiment, the system is executed on a single computer system, without requiring a connection to a server computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

Various embodiments of methods and systems for controlling functions of a vehicle control system are provided. It should be noted that although the various embodiments are described in connection with the automotive industry, such as for an automobile, one or more embodiments may be implemented in different industries and for different applications. Additionally, communication of information used in accordance with one or more embodiments may be performed with different types of communication protocols, as well as using different types of communication lines and communication buses.

One or more embodiments include a system, which may be implemented as a programmable logic controller (PLC), also referred to as a programmable logic circuit that controls various functions and operations of the vehicle, such as the climate control system, navigation system, information system, audio system, phone system, rear entertainment system, and the like. The controller may control display functions on one or more display devices or screens. The controller may monitor, receive, detect, and/or transmit one or more inputs or outputs between a display device and a control panel.

In various embodiments, the system may include a first display on a display device and a control panel of the vehicle with a touchpad that is remote from the first display. The control panel and the touchpad may be located such that an operator, or user, of the vehicle may easily touch the touchpad without being distracted from safely operating the vehicle. The first display on the display device may be located at a position higher than the touchpad, such that the operator may easily view the first display without being distracted from safely operating the vehicle. In alternative embodiments, the system may include a first display on a display device and a second display on a touchscreen of a control panel of the vehicle.

The terms "touch," "click," and "tap" refer to user interactions with items on a touchpad. A user may make contact with a button by pressing the corresponding location on the touchpad. If the user makes contact on the touchpad, then that is considered a "touch". If the user press and releases under a predetermine period of time, then that is considered a "click" or "tap" of the button and the associated controller performs the corresponding action.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Figure 1:
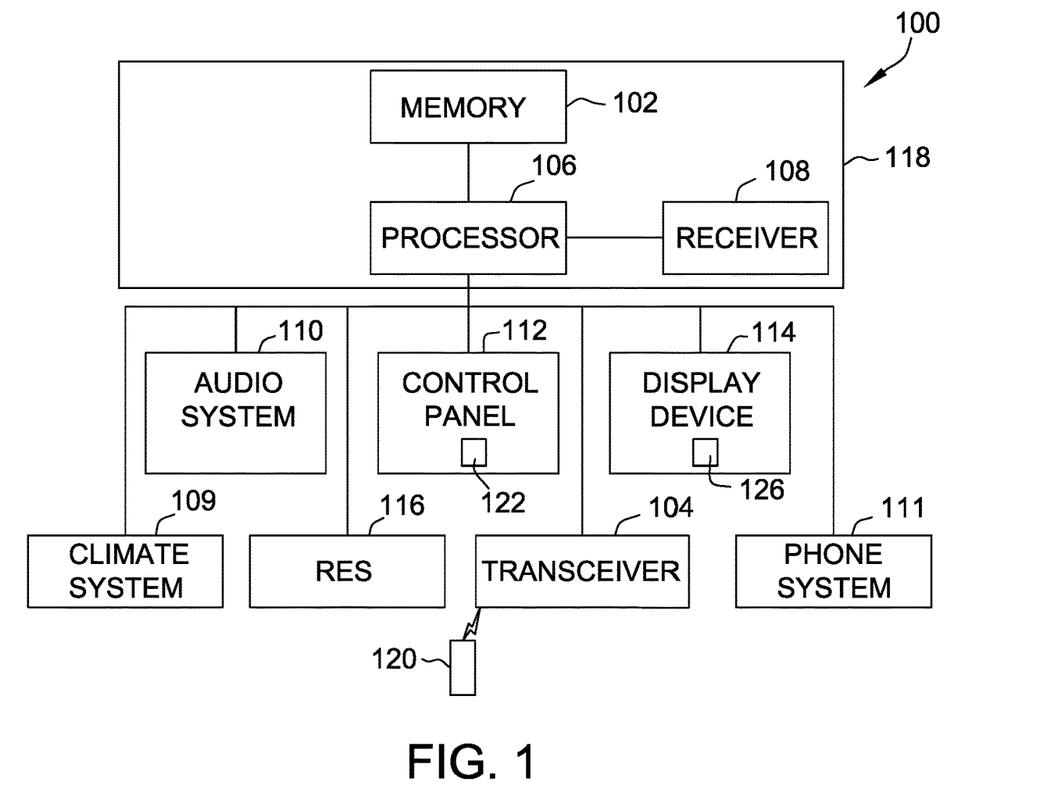
FIG. 1 is a block diagram of an exemplary vehicle control system consistent with various embodiments.

FIG. 1 illustrates a block diagram of an exemplary vehicle control system 100, consistent with various embodiments. The vehicle control system 100 may include a memory 102, a transceiver 104, a processor 106, a receiver 108, a climate control system 109, an audio system 110, a phone system 111, a control panel 112, a display device 114 and a rear entertainment system (RES) 116. In some embodiments, memory 102, transceiver 104, processor 106 and receiver 108 may be included in a computing device, such as a dedicated controller for the system 100 or into another component in the vehicle, such as a navigation system 118 of the vehicle.

The processor 106 may include one or more conventional electronic processors that interpret and execute instructions. The memory 102 may include a random access memory (RAM), a read-only memory (ROM), and/or another type of dynamic or static storage device that stores information and instructions for execution by the processor 106. The RAM, or another type of dynamic storage device, may store instructions as well as temporary variables or other intermediate information used during execution of instructions by the processor 106. The ROM, or another type of static storage device, may store static information and instructions for the processor 106.

The transceiver 104 may communicate with the processor 106 via a communication line, and may communicate wirelessly or via a wired connection with a portable device 120. The portable device 120 may include a mobile phone or other communication device. In some embodiments, the transceiver 104 may communicate wirelessly with the portable device 120 via a Bluetooth® (Bluetooth is a registered trademark of Bluetooth Sig., Inc. of Bellevue, Wash.) protocol. In other embodiments, another wireless protocol may be used. In some embodiments, the transceiver 104 may be included as part of the navigation system 118.

The receiver 108 may communicate with the processor 106 via the communication line and may receive information from one or more global positioning satellites, or another type of global positioning system. The audio system 110 may include one or more speakers for playing audio content. The RES 116 may be located such that passengers at a rear passenger location of a vehicle may be entertained. The RES 116 may include a display screen for displaying video or picture images and one or more speakers located at the rear passenger location of the vehicle.

The control panel 112 may communicate with the processor 106 via a communication line to transmit data to/from the control panel 112, such as for control of other modules or systems of the vehicle control system 100. The control panel 112 includes a touchpad 122 for receiving an input from a user for control of the vehicle control system 100. The touchpad 122 may display virtual buttons that may be touched by the user of the vehicle to control the vehicle control system 100. In an exemplary embodiment, the virtual buttons are created or formed on the touchpad 122 to give the touchpad 122 three-dimensional contours that provide tactile or haptic feedback to the user. Alternatively, the virtual buttons are created using vibrations or motions to simulate buttons on the touchpad 122 that provide tactile or haptic feedback to the user. Optionally, the virtual buttons may have icons on the touchpad 122 that are displayed and visible. The control panel 112 may have other input devices, such as other mechanical buttons around the touchpad 122 that may receive inputs for controlling the vehicle control system 100. The control panel 112 may have a dedicated control module or unit configured to process the control inputs and/or to process the data to be displayed on the display device 114 and/or the touchpad 122. Alternatively, such control functions may be processed by the processor 106.

The display device 114 may communicate with the processor 106 via a communication line to transmit data to/from the display device 114, such as for display of various information to the user of the vehicle. The display device 114 includes a display screen 126 for displaying information to the user. In an exemplary embodiment, the display device 114 is separate from the control panel 112, such as located at a different location in the vehicle. For example, the display device 114 can be positioned for convenient viewing by the user and the touchpad 122 can be positioned within a comfortable distance from a hand of the user. The display screen 126 may display different icons, graphics, and the like than the touchpad 122. The virtual buttons on the touchpad 122 may correspond to and be mapped to the display icons on the display screen 126.

Figure 2A:
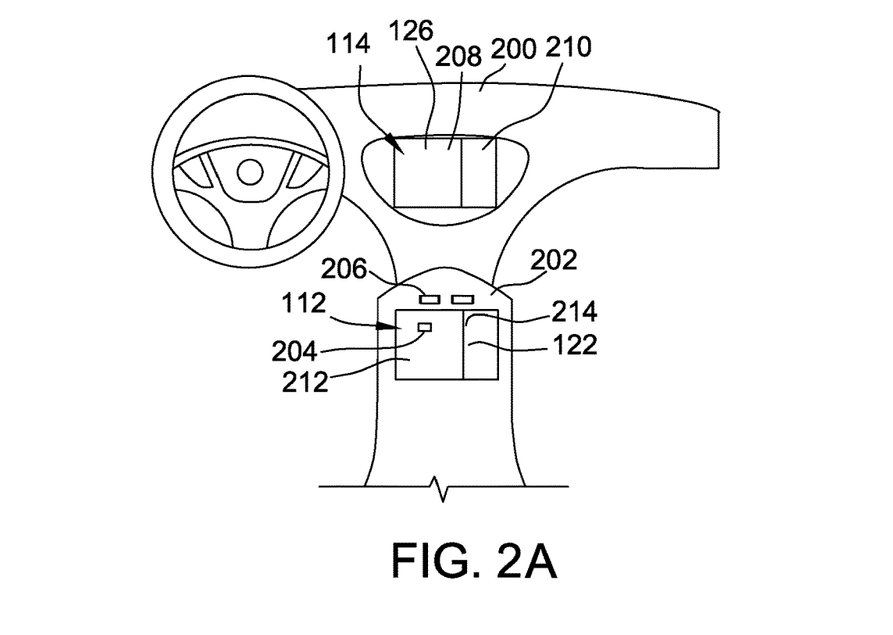
FIG. 2A illustrates positioning of some components of the vehicle control system shown in FIG. 1 within a vehicle in accordance with an exemplary embodiment.

FIG. 2A illustrates an arrangement of some components of the vehicle control system 100 within a vehicle in accordance with an exemplary embodiment. The vehicle includes a dashboard 200 and a center console 202. In an exemplary embodiment, the display device 114, including the display screen 126, is positioned at a central portion of the dashboard 200 such that a user, or an operator/driver, of a vehicle may easily view the display screen 126 without being distracted from operating the vehicle. The display screen 126 may be located close to eye level such that the user of the vehicle may view the display screen 126 while being able to peripherally view a roadway ahead. In other embodiments, the display screen 126 may be positioned at another location within the vehicle.

The control panel 112 may be located next to the user of the vehicle. The touchpad 122 is positioned to be easily reachable by the hand of the user while operating the vehicle. In some embodiments, the control panel 112 may be located in a center console area next to the user. The touchpad 122 allows the user to select icons displayed on the display screen 126 and associated functions. The control panel 112 may include selectable function controls 204 on the touchpad 122. For example, the selectable function controls 204 may be virtual buttons. The selectable function controls 204 may be pads, sliders, dials, and the like. In an exemplary embodiment, the selectable function controls 204 are not fixed in position on the touchpad 122, but rather may be positioned, centered or re-centered based on where the user touches the touchpad 122. Optionally, the control panel 112 may include fixed selectable function controls 206 that are exterior of the touchpad 122. For example, the controls 206 may be hard buttons, such as pads, sliders, knobs, dials and the like positioned around, such as above, below, along-side or elsewhere relative to the touchpad 122. In some embodiments, selectable function controls 204 may be embedded under the touch pad. The entire pad moves down with the click or the tap to press the selectable function controls 204.

The control panel 112 is operably coupled to the display device 114, as well as the various sub-systems of the vehicle control system 100, such as the climate control system, navigation system, information system, audio system, phone system, rear entertainment system, and the like. For example, the control panel 112, the display device 114 and the components of the sub-systems may be operably coupled to the processor 106 (shown in FIG. 1).

The display device 114 may have a home menu or main menu having display icons corresponding to the various sub-systems. The control panel 112 is used to maneuver through the main menu, such as to activate control of one of the sub-systems. For example, the user may touch the touchpad 122 and navigate to activate the various function modes or sources and/or to activate various function controls associated with the modes or sources. Such activation or execution may be performed by selecting a virtual button on the touchpad 122 associated with one of the display icons to activate control of the mode or source associated with such sub-system.

Optionally, when one of the sub-systems is activated (e.g. by pressing on the touchpad 122), the display icons on the display device 114 may change, such as to represent various function controls of the selected sub-system. Optionally, when the display icons on the display device 114 change, the virtual buttons on the touchpad 122 correspondingly change. In an exemplary embodiment, as the function controls are selected and/or manipulated on the touchpad 122, the operation of the sub-system may be controlled, such as to change the radio station, to place a phone call, to input a destination into the navigation system 118, and the like.

In the exemplary embodiment, display screen 126 is divided into two sections (also described as zones), a first display section 208 and a second display section 210. In these embodiments, touchpad 122 is also divided into two sections, a first touch section 212 and a second touch section 214. In these embodiments, first display section 208 corresponds to first touch section 212 and second display section 210 corresponds to second touch section 214. In these embodiments, a user touch on first touch section 212 interacts with one or more objects on first display section 208 and a user touch on section touch section 214 interacts with one or more objects on section display section 210. In these embodiments, each of first touch section 212 and second touch section 214 are independent of each other and are independently touchable. In some embodiments, where display screen 126 is a touchscreen, first touch section 212 and first display section 208 are combined. Similarly, in these embodiments, second touch section 214 and second display section 210 are also combined.

In some embodiments, touchpad 122 is an absolute pointing device. In these embodiments, the upper left corner of touchpad 122 corresponds to the upper left corner of display screen 126. For example, a user contact with the bottom right corner of first touch section 212 corresponds directly to a user contact with the bottom right corner of first display section 208. When the user places their finger on first touch section 212 at coordinates X, Y, system 100 highlights the item closest to screen coordinates X, Y on first display section 208.

Figure 2B:
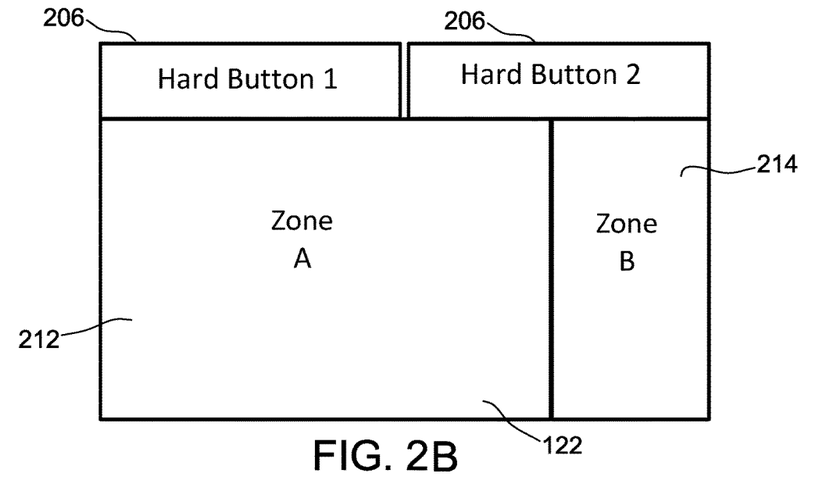
FIG. 2B illustrates a close-up view of the touchpad shown in FIG. 2A.

FIG. 2B illustrates a close-up view of touchpad 122 shown in FIG. 2A. Touchpad 122 includes a first touch section 212 and a second touch section 214. Touchpad also includes one or more hard buttons 206. Touch pad 122 may include a button embedded under the first touch section 212 or the second touch section 214. The entire first touch section 212 or second touch section 214 moves down with the click or the tap to press the button when the user selects an item on the display screen 126.

Figure 3:
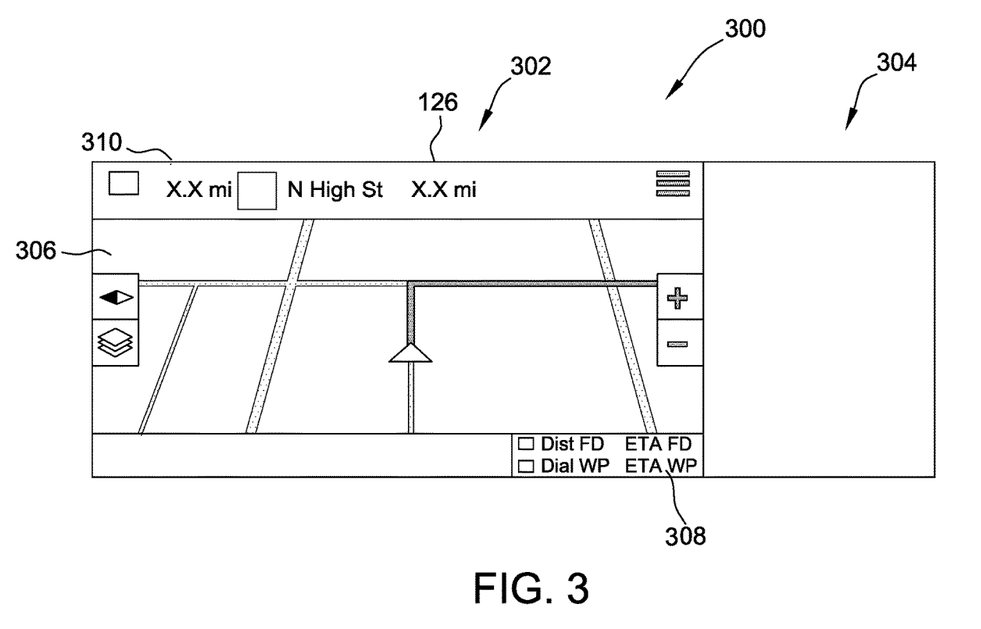
FIG. 3 illustrates the display screen showing an exemplary view of route guidance mode.

FIG. 3 illustrates the display screen 126 showing an exemplary view 300 of route guidance mode. In the exemplary embodiment, view 300 is displayed on display screen 126, which is positioned in the dashboard 200 of a vehicle as shown in FIG. 2A.

In the exemplary embodiment, display screen 126 is divided into two sections, a first section 302 (which is similar to first display section 208 shown in FIG. 1) and second section 304 (which is similar to second display section 210 shown in FIG. 1). In the exemplary embodiment, first section 302 displays a route navigation program, which is currently display a route guidance mode. In the exemplary embodiment, the route navigation program is executed by navigation system 118 (shown in FIG. 1), where the navigation system 118 receives and/or detects inputs from touchpad 122 (shown in FIG. 1) and transmits instructions to display screen 126.

In route guidance mode, first section 302 of display screen 126 displays a map screen 306 that includes turn by turn guidance and maps to direct the user to a chosen location, an estimated time of arrival (ETA) area 308 that includes the distance and time to the final destination, and a navigation bar 310 that displays additional information, such as direction of travel, suggested lane choices, the direction and location of the next turn, and/or distance to the next turn. In some embodiments, ETA area 308 shows the distance and/or time to the next waypoint (also known as remaining distance and remaining time, respectively) in a multiple waypoint trip. As the user travels along the route, navigation system 118 updates first section 302 of display screen 126 with information based on the user's current position in the trip.

Figure 4A:
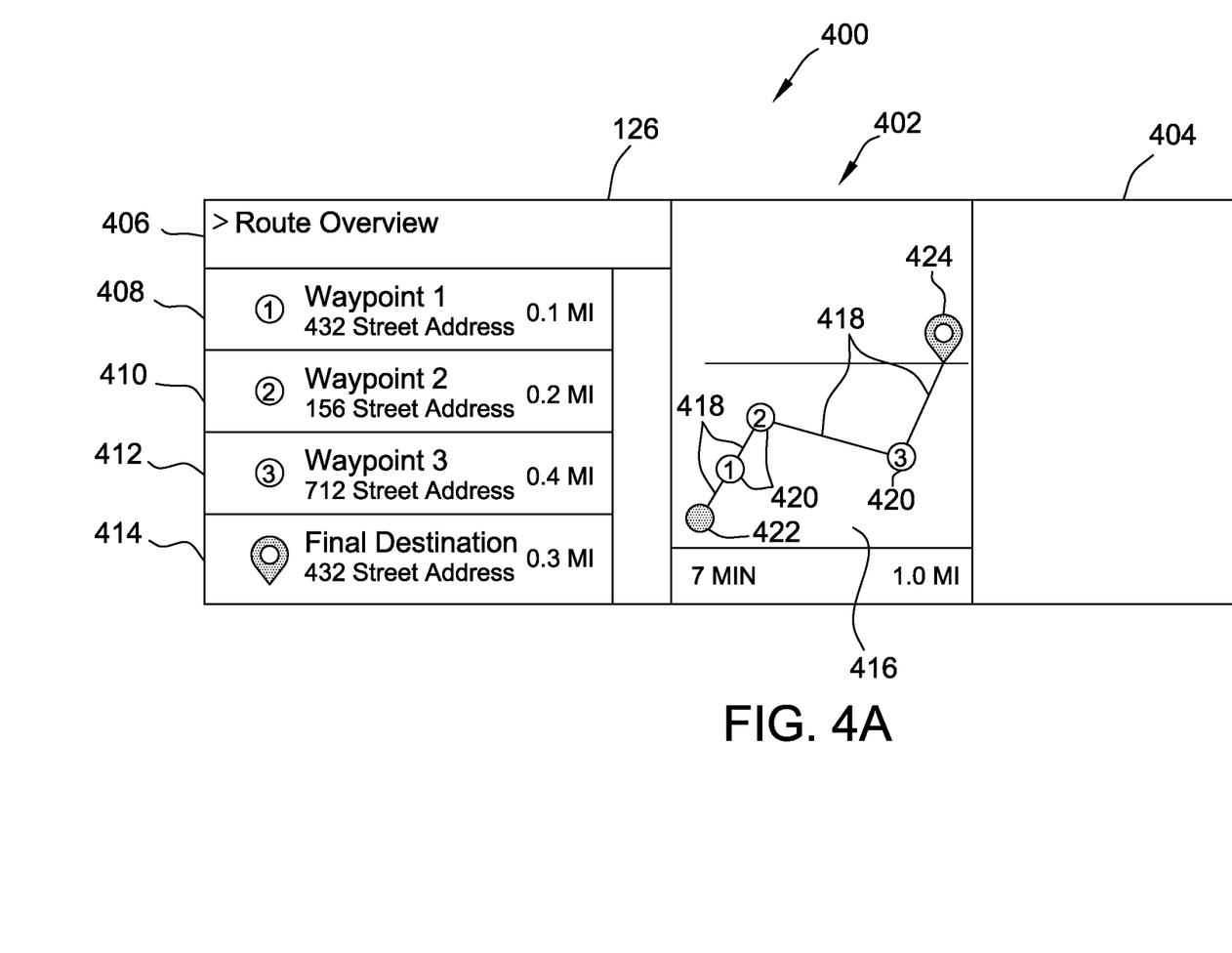
FIG. 4A illustrates the display screen showing an exemplary view of route overview mode.

When the user taps on the ETA area 308, navigation system 118 updates first section 302 of display screen 126 to display view 400 as shown in FIG. 4A. More specifically, when the user connects with a portion of first touch section 212 (shown in FIG. 2A) corresponding to the location of ETA area 308 on first section 302, navigation system 118 activates a route overview mode, which displays at least the starting point and the ending point of the route being described. In the exemplary embodiment, route overview mode also displays one or more waypoints, which are points that are to be traveled to in order before traveling to the final destination. For example, in a route with two waypoints, the user is directed on how to travel from the starting point, or current location, to the first waypoint, then the second waypoint, and then to the ending location or final destination. In some embodiments, waypoints are also called destinations, as each is a destination of the user, along the route to get to the ending location or final destination.

FIG. 4A illustrates the display screen 126 showing an exemplary view 400 of route overview mode. In the exemplary embodiment, view 400 is displayed on display screen 126, which is positioned in the dashboard 200 of a vehicle as shown in FIG. 2A.

In view 400, display screen 126 is divided into a first section 402 and a second section 404. First section 402, which is similar to first display section 208, displays a route overview for the route being shown in view 300 (shown in FIG. 3). In route overview mode, navigation bar 310 (shown in FIG. 3) is replaced with a mode information bar 406. The route overview includes a plurality of waypoint listings 408, 410, and 412, as well as a destination 414.

Route overview mode also includes a route map 416 of the waypoints, showing an overview of the route that will be taken based on the waypoint listings 408, 410, and 412, the destination 414, and the order that the waypoints are in. Route map 416 includes visual representations of the route segments 418, the waypoints 420, the starting location 422 (or current location), and the ending location 424 (or final destination). Each of the waypoints 420 correspond to one of the waypoint listings 408, 410, and 412. Ending location 424 corresponds to destination 414.

In the exemplary embodiment, the user may transition from route overview mode to an edit mode by selecting a waypoint listing 408, 410, or 412. In the exemplary embodiment, the user activated edit mode by pressing on the portion of first section 402 corresponding to the waypoint listing 408, 410, or 412 that the user wishes to select. In the exemplary embodiment, the user touches and the clicks (or taps) on the corresponding portion. In other embodiments, the user presses on the corresponding portion and holds for a predefined period of time (aka 1 second) until edit mode is activated. In the exemplary embodiment, the touchpad 122 (shown in FIG. 2A) detects a first touching and a first tapping on the waypoint listing 408, 410, or 412 that the user wishes to select.

Figure 4B:
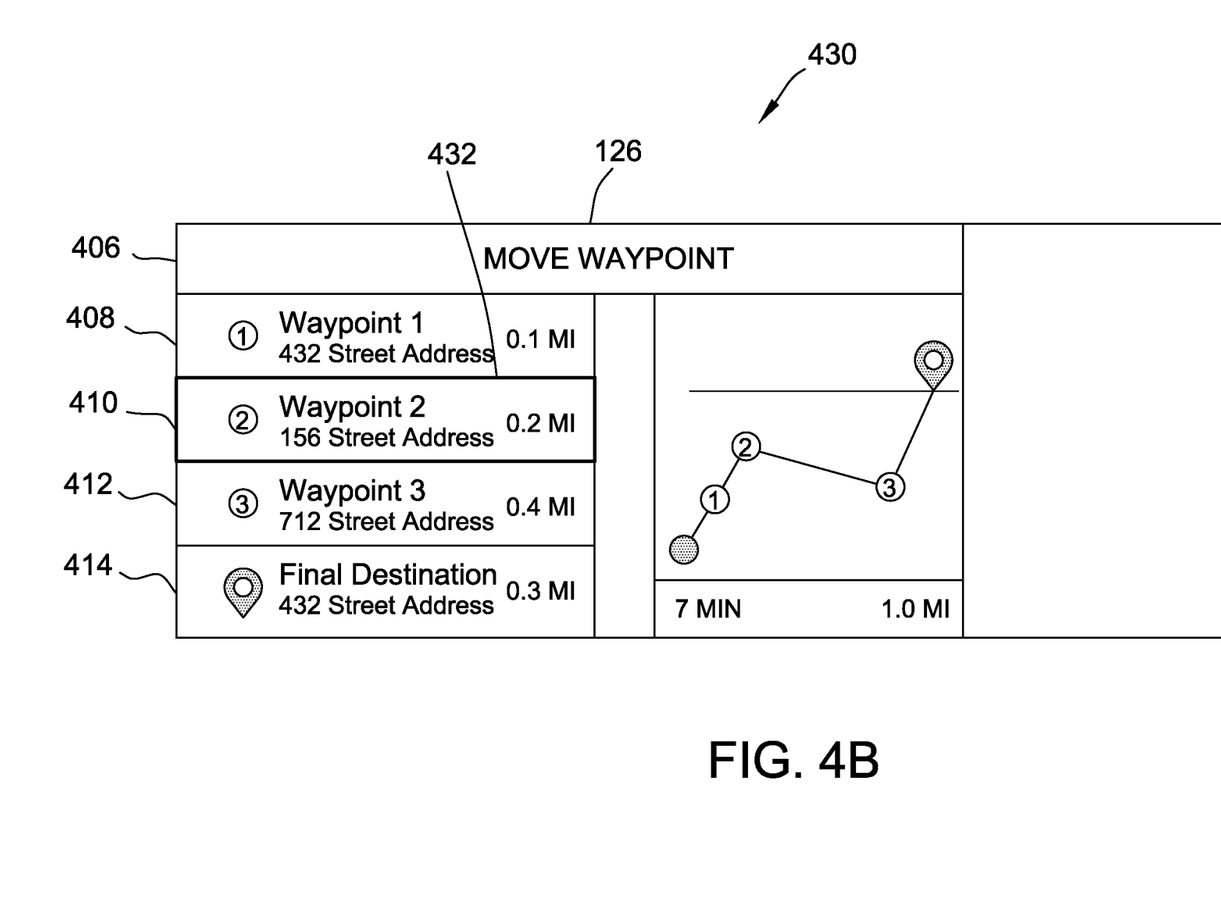
FIGS. 4B-4E illustrate the display screen showing exemplary views of edit mode.

FIG. 4B illustrates the display screen 126 showing an exemplary view 430 of edit mode. In the exemplary embodiment, view 430 is displayed on display screen 126, which is positioned in the dashboard 200 of a vehicle as shown in FIG. 2A.

In view 430, edit mode has been activated as described above. Mode information bar 406 is updated to inform the user that edit mode is active and that the user may move a waypoint. In view 430, the user selected Waypoint 2 to move. The selected waypoint listing 410 is highlighted with a first indicator 432. The selected waypoint listing 410 represents the waypoint listing that the user selected based on a first touching and a first tapping detected by the touchpad 122 (shown in FIG. 2A). In the exemplary embodiment, the indicator 432 is an outline of the waypoint listing 410 in a different color. In other embodiments, the first indicator 432 may include, but is not limited to, changing the color of the listing background, changing the color of the lettering of the waypoint listing, or any other visual identifier to distinguish the selected waypoint listing from the other waypoint listings.

In the exemplary embodiment, the user's finger touches the portion of the first touch section 212 (shown in FIG. 2A) that corresponds to the desired waypoint 410, which is the second waypoint listing 410. This touching is the first touching. In the exemplary embodiment, the user's finger that is touching the first touch section 212 performs a tap on the first touch section. This tap is the first tapping. In the exemplary embodiment, the first touch section 212 detects the touch followed by the tap and the first indicator 432 is displayed around the second waypoint listing 410. In some embodiments, the first indicator 432 is displayed after the first touching. In these embodiments, the first indicator 432 may be displayed in a first color after the first touching and in a second color after the first tapping. In these embodiments, if the user moves his finger on the first touch section 212 without lifting the finger, then the display screen 126 moves the first indicator 432 accordingly. For example, if the user moved his finger down on first touch section 212 from the area corresponding to the second waypoint listing 410 to the third waypoint listing 412, then display screen 126 would move the first indictor 432 down to the third waypoint listing 412. In this case, the user may see that their finger is touching a location corresponding to the second waypoint listing 410, when they actually wanted the third waypoint listing 412.

Figure 4C:
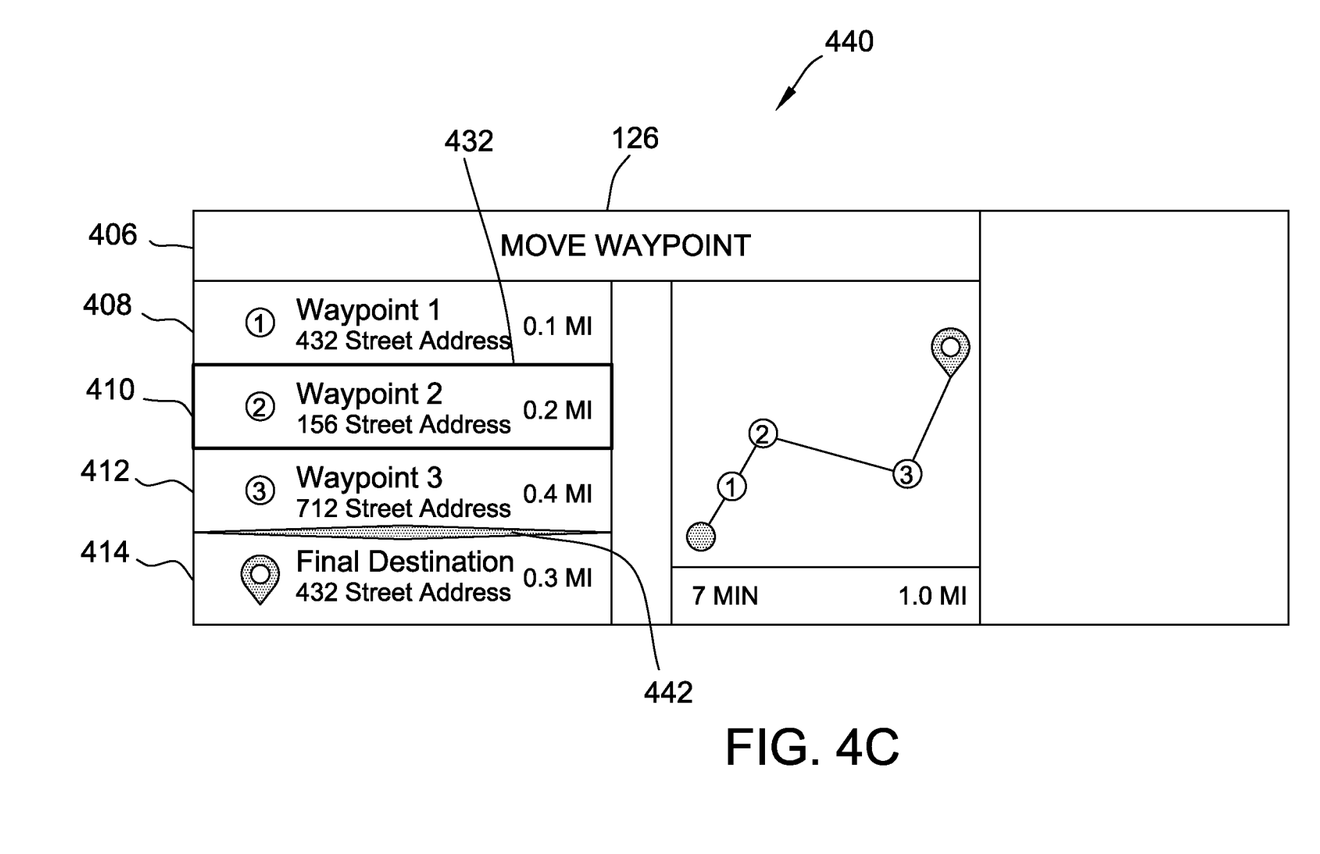

FIG. 4C illustrates the display screen 126 showing an exemplary view 440 of edit mode. In the exemplary embodiment, view 440 is displayed on display screen 126, which is positioned in the dashboard 200 of a vehicle as shown in FIG. 2A.

In view 440, edit mode has been activated and the user is choosing a new position in the list of waypoints for the selected waypoint. As shown in view 440, the selected waypoint listing 410 is still identified with the first indicator 432. A second indicator 442 is displayed to show where the selected listing is to be placed. In the exemplary embodiment, first indicator 432 and second indicator 442 are displayed simultaneously.

In the exemplary embodiment, the user's finger touches the portion of the first touch section 212 (shown in FIG. 2A) that corresponds to the desired location, which is in between the third waypoint listing 412 and the destination 414. This touching is the second touching. The first touch section 212 detects the touch and the second indicator 442 is displayed in between the third waypoint listing 412 and the destination 414. In other embodiments, the user touches the corresponding section of the first touch section 212 and the display screen 126 places the second indicator 442 in the corresponding location where the user is touching. If the user touches in a location that corresponds to one of the waypoint listings, the display screen 126 places the second indicator 442 at the closest intersection of two waypoint listings. If the user moves his finger on the first touch section 212 without lifting the finger, then the display screen 126 moves the second indicator 442 accordingly. For example, if the user moved his finger down on first touch section 212, then display screen 126 would move the second indictor 442 down to after the destination 414. In this case, the user may change the destination 414 to the selected waypoint listing 410 and turn the destination 414 into a waypoint. After the second touching, the user selects the location indicated by the second indicator 442 is desired by providing a second tapping on the touchpad 122 (shown in FIG. 2A).

Figure 4D:
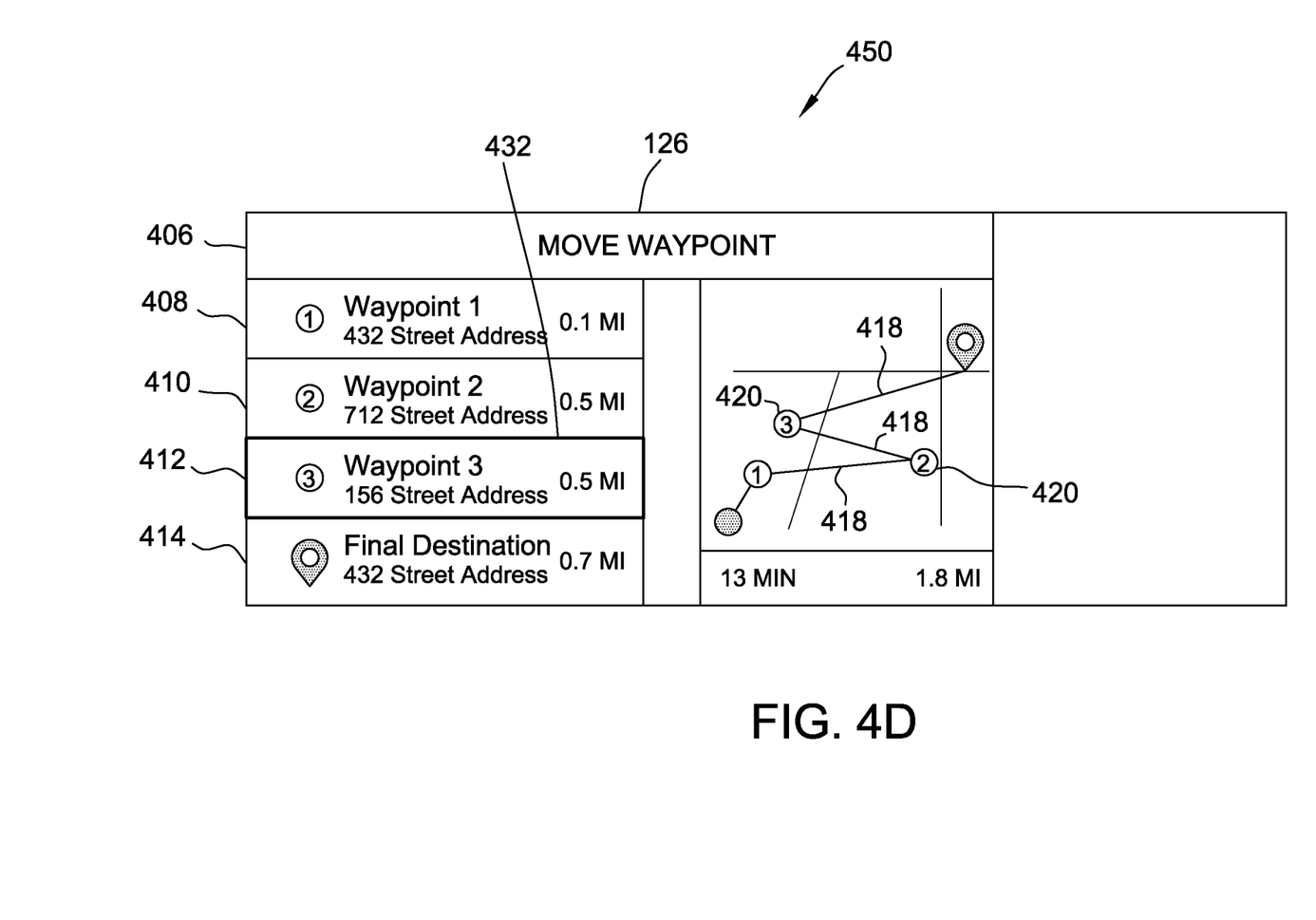

FIG. 4D illustrates the display screen 126 showing an exemplary view 450 of edit mode. In the exemplary embodiment, view 450 is displayed on display screen 126, which is positioned in the dashboard 200 of a vehicle as shown in FIG. 2A.

View 450 illustrates the display screen 126 after the user has selected the position for the selected waypoint in the list. The list has been updated to recognize that change and the route segments 418 on the route map 416 have been rearranged to show the order in which the waypoints 420 will be visited. Waypoint 2 is now located in waypoint listing 412 and waypoint 3 is now located in waypoint listing 410. In the exemplary embodiment, waypoint 2 is still identified with the first indicator 432. In some embodiments, the user may continue to select different positions for waypoint 2 until the user unselects the waypoint or exits the edit mode.

Figure 4E:
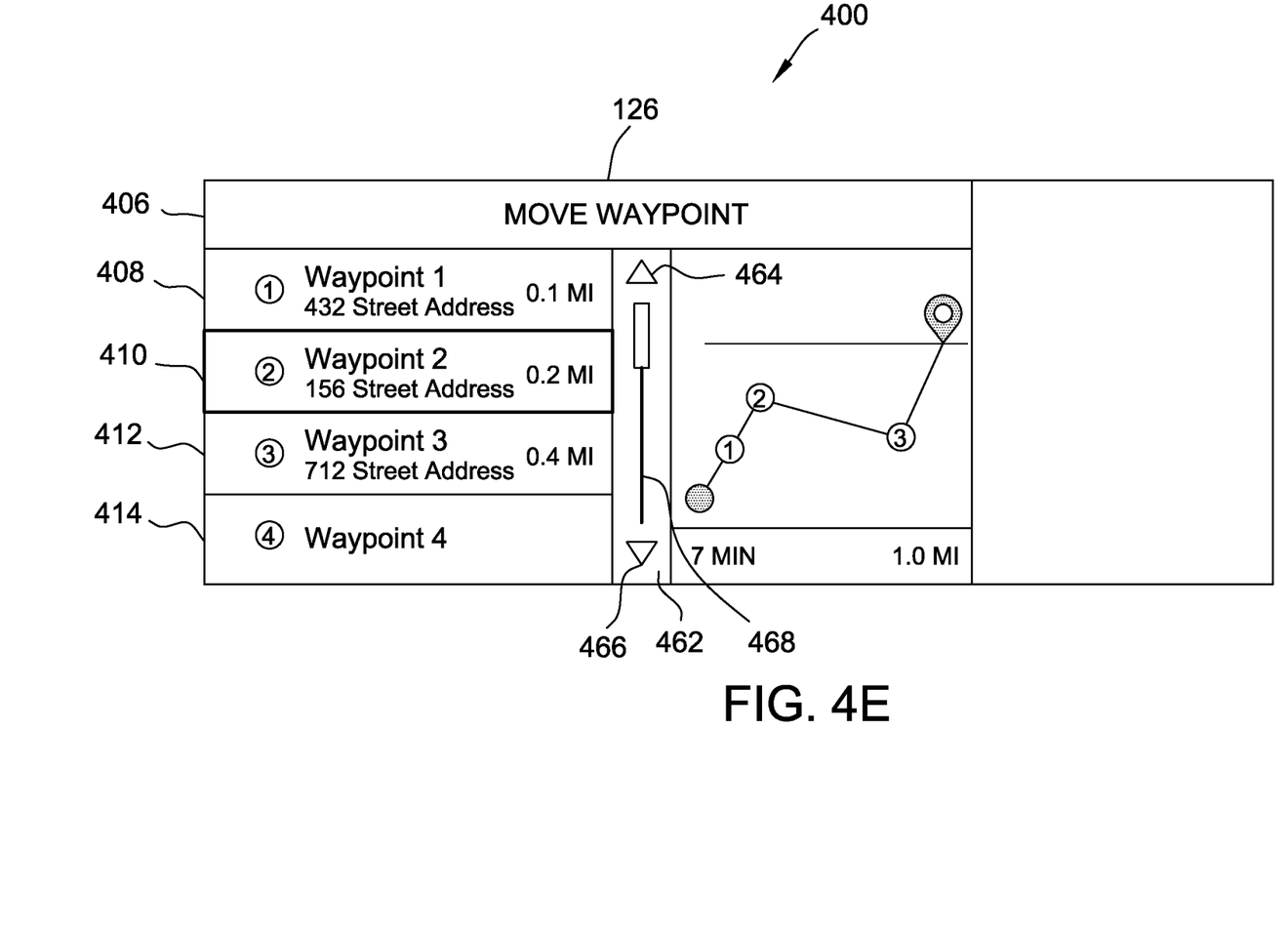

FIG. 4E illustrates the display screen 126 showing an exemplary view 460 of edit mode. In the exemplary embodiment, view 460 is displayed on display screen 126, which is positioned in the dashboard 200 of a vehicle as shown in FIG. 2A.

In view 460, the listing of waypoints exceeds the available space on display screen 126. In this view 460, destination 414 has been moved off of display screen 126 and replace by an additional waypoint listing 470. One or more waypoints and the destination 414 (shown in FIG. 4A) are beyond the bottom of the display screen 126. View 460 also includes a scroll bar 462 that allows the user to navigate to the other waypoint listings. Scroll bar 462 includes an up arrow 464 and a down arrow 466 for shifting the viewable listings up or down. Scroll bar 462 also includes a position indicator 468 to indicate where in the list of waypoints the user is.

In the exemplary embodiment, the user may move the selected waypoint to a position in the list that is currently not visible. In this embodiment, the user taps on the down arrow 466 until the desired position is visible and then selects that position. The selected waypoint listing is moved from its current position to the selected position. For example the user provides a first touching and a first tapping on the selected waypoint 410. Then user taps on the down arrow 466. View 460 changes by scrolling down the waypoints until the desired location is shown. The user then provides the section touching and the second tapping on the desired location.

Figure 5:
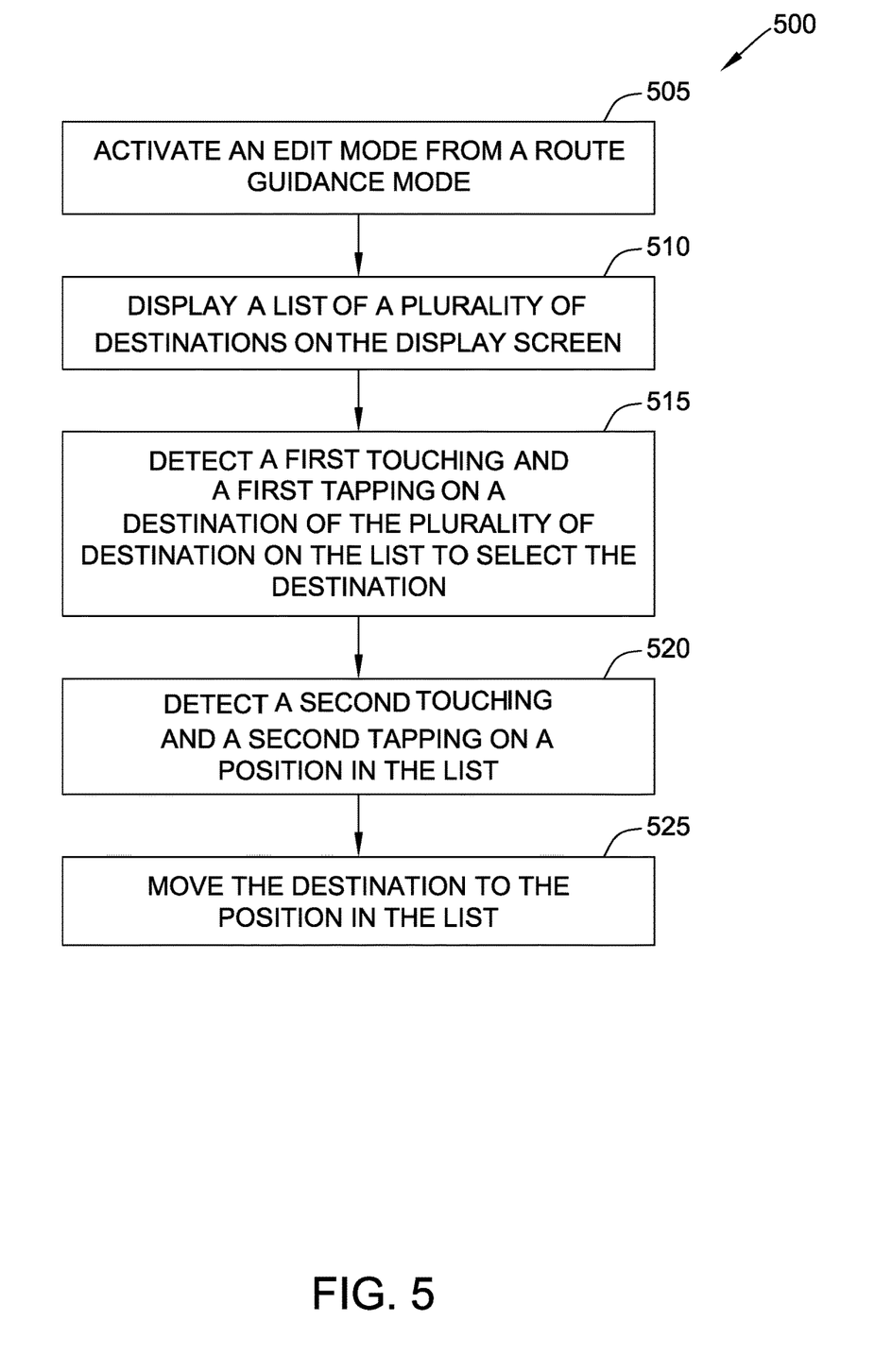
FIG. 5 is a flow chart of an exemplary process for use in modifying a route with waypoints using the system shown in FIG. 1.

FIG. 5 is a flow chart of an exemplary process 500 for use in modifying a route with waypoints using system 100 shown in FIG. 1. In the exemplary embodiment, process 500 is performed by navigation system 118 (shown in FIG. 1). In other embodiments, process 500 is performed by an intermediary computer device (not shown), such as an infotainment system controller, in communication with navigation system 118.

In the exemplary embodiment, in process 505 navigation system 118 activates edit mode from route guidance mode. In some embodiments, in the process 505, edit mode is directly activated from route guidance mode. In the exemplary embodiment, edit mode is activated from a route overview mode, which is in turn activated from route guidance mode. In the exemplary embodiment, route guidance mode includes driving directions and an ETA area, such as ETA area 308 (shown in FIG. 3). In the process 505, when a user taps on the touchpad 122 in a position that corresponds to the ETA area 308, navigation system 118 activates route overview mode.

In route overview mode, display screen 126 displays the list of the plurality of destinations. In the process 505, when navigation system 118 detects a user hold input on one of the locations in the list, navigation system 118 activates edit mode.

In the exemplary embodiment, in process 510, navigation system 118 displays a list of plurality of destinations on the display screen 126 (shown in FIG. 1). The destinations may include intermediary waypoints and the final destination of the route. The list of destinations illustrates the order of locations that the user will travel to following this route.

In the exemplary embodiment, in process 515, navigation system 118 detects a first touching and a first tapping on the touchpad 122 (shown in FIG. 1) in an area that corresponds to a destination of the plurality of destinations on the list to select the destination. The touchpad 122 receives an input from the user selecting one of the destinations as the destination to move. In the exemplary embodiment, navigation system 118 instructs display screen 126 to display a first indicator, such as first indicator 432 (shown in FIG. 4B) on the destination to indicate selection after the first tapping.

In the exemplary embodiment, in process 520, navigation system 118 detects a second touching on the touchpad 122 in an area that corresponds to a position in the list. In the exemplary embodiment, navigation system 118 instructs display screen 126 to display a second indicator, such as second indicator 442 (shown in FIG. 4C), on the selected position to indicate where the selected destination will be placed. In the exemplary embodiment, the second indicator is a squashed diamond to show that the destinations above and below the indicator on the list will be moved aside. In other embodiments, the second indicator may be any graphical indication to show the selected position, such as, but not limited to, a double headed arrow. In the exemplary embodiment, the first indicator and the second indicator are displayed simultaneously.

In the exemplary embodiment, in process 525, navigation system 118 moves the selected destination to the selected position in the list after the second tapping. In the exemplary embodiment, the selected destination retains the first indicator after moving to the selected position.

In some embodiments, the number of destinations in the list exceeds the available space on display screen 126. In these embodiments, display screen 126 displays a portion of the list of destinations. Display screen 126 also displays a scroll bar 462, with an up arrow 464, and a down arrow 466 (all shown in FIG. 4E). In the process 515, after detecting the first touching and the first tapping, navigation system 118 detects a user tap on the touchpad 122 in an area that corresponds to at least one of the up arrow 464 and the down arrow 466. The navigation system 118 adjusts the display screen 126 to display a new portion of the list based on the user input. In the process 520, the navigation system 118 is configured to detect the second touching and the second tapping in the displayed new portion of the list.

In some embodiments, the display screen 126 includes a first display section 208 and a second display section 210 (both shown in FIG. 2A). In these embodiments, touchpad 122 includes a first touch section 212 and a second touch section 214 (both shown in FIG. 2A). In these embodiments, the navigation system 118 transmits outputs to the first display section 208 and detects user inputs on the first touch section 212, where the first touching, first tapping, second touching, and second tapping are all detected in the first touch section 212.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the Willis "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

While the disclosure has been described in terms of various specific embodiments, those skilled in the art will recognize that the disclosure can be practiced with modification within the spirit and scope of the claims.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal languages of the claims.

What is claimed is:

1. A method for modifying route navigation with waypoints, said method implemented by a computer device including at least one processor in communication with at least one memory device, said method comprising:
providing a display screen and a touchpad in a vehicle, wherein the display screen and the touchpad are separate and apart from one another, and wherein one or more virtual buttons are simulated on the touchpad by vibrating the touchpad to provide haptic feedback to a user in response to the user contacting the touchpad;

activating an edit mode from a route overview mode;

displaying a list of a plurality of destinations on the display screen, wherein the locations of the one or more virtual buttons on the touchpad correspond to positions of the plurality of destinations on the display screen;

detecting a first tapping on the touchpad in an area that corresponds to a destination of the plurality of destinations on the list to select the destination, wherein the user discontinues contact with the touchpad subsequent to the first tapping;

displaying a first indicator positioned adjacent to the selected destination to indicate selection after the first tapping;

detecting a subsequent touching on the touchpad in an area that corresponds to a position in the list;

displaying a second indicator between two adjacent destinations to indicate the position on the list during the subsequent touching, wherein the second indicator represents a current position where the user is in contact with the touchpad, wherein the first indicator and the second indicator are simultaneously displayed with the first indicator positioned adjacent to the selected destination and the second indicator between the two adjacent destinations; and moving the destination to the position in the list when the user discontinues contact with the touchpad subsequent to the subsequent touching.

2. The method in accordance with claim 1 wherein the first indicator is an outline of the selected destination.

3. The method in accordance with claim 1 further comprising displaying the first indicator after moving the selected destination to the position in the list.

4. The method in accordance with claim 1, further comprising:

displaying a portion of the list of the plurality of destinations;

displaying a scroll bar including an up arrow and a down arrow;

after detecting the first tapping, detecting a user tap on the touchpad in an area that corresponds to at least one of the up arrow and the down arrow;

displaying a new portion of the list of the plurality of destinations; and detecting the subsequent touching on the touchpad in an area that corresponds to the new portion.

5. The method in accordance with claim 1, wherein the touchpad includes a first touch section and a second touch section, wherein the display screen includes a first display section and a second display section, and wherein the first tapping and the subsequent touching are conducted in the first touch section.

6. The method in accordance with claim 1 further comprising:

displaying a route overview mode including the list of the plurality of destinations;

detecting a stationary user hold input on the touchpad; and activating the edit mode based on the stationary user hold input.

7. The method in accordance with claim 6 further comprising:

displaying a route guidance mode including driving directions;

detecting a user tap on the touchpad; and activating the route overview mode based on the user input.

8. The method in accordance with claim 7, wherein the route overview mode includes an ETA area, and wherein the user tap on the touchpad is in an area that corresponds to the ETA area of the route overview mode, and wherein the ETA area includes at least one of remaining time and remaining distance to waypoints.

9. A computer device for modifying route navigation with waypoints, said computer device comprising at least one processor in communication with at least one memory device, said computer device in communication with a display screen and a touchpad, said computer device programmed to:

operate the display screen and the touchpad in a vehicle, wherein the display screen and the touchpad are separate and apart from one another, and wherein one or more virtual buttons are simulated on the touchpad by vibrating the touchpad to provide haptic feedback to a user in response to the user contacting the touchpad;

activate an edit mode from a route overview mode;

display a list of a plurality of destinations on the display screen, wherein the locations of the one or more virtual buttons on the touchpad correspond to positions of the plurality of destinations on the display screen;

detect a first tapping on the touchpad in an area that corresponds to a destination of the plurality of destinations on the list to select the destination, wherein the user discontinues contact with the touchpad subsequent to the first tapping;

display a first indicator positioned adjacent to the selected destination to indicate selection after the first tapping;

detect a subsequent touching on the touchpad in an area that corresponds to a position in the list;

displaying a second indicator between two adjacent destinations to indicate the position on the list during the subsequent touching, wherein the second indicator represents a current position where the user is in contact with the touchpad, wherein the first indicator and the second indicator are simultaneously displayed with the first indicator positioned adjacent to the selected destination and the second indicator between the two adjacent destinations; and move the destination to the position in the list when the user discontinues contact with the touchpad subsequent to the subsequent touching.

10. The computer device in accordance with claim 9, wherein the first indicator is an outline of the selected destination.

11. The computer device in accordance with claim 9, wherein said computer device is further programmed to display the first indicator after moving the selected destination to the position in the list.

12. The computer device in accordance with claim 9, wherein said computer device is further programmed to:

display a portion of the list of the plurality of destinations;

display a scroll bar including an up arrow and a down arrow;

after detecting the first tapping, detect a user tap on the touchpad in an area that corresponds to at least one of the up arrow and the down arrow;

display a new portion of the list of the plurality of destinations; and detect the subsequent touching on the touchpad in an area that corresponds to the new portion.

13. The computer device in accordance with claim 9, wherein the touchpad includes a first touch section and a second touch section, wherein the display screen includes a first display section and a second display section, and wherein the first tapping and the subsequent touching are conducted in the first touch section.

14. The computer device in accordance with claim 9, wherein said computer device is further programmed to:
   display a route overview mode including the list of the plurality of destinations;
   detect a stationary user hold input on the touchpad; and
   activate the edit mode based on the stationary user hold input.

15. The computer in accordance with claim 14, wherein said computer device is further programmed to:
   display a route guidance mode including driving directions and an ETA area;
   detect a user input wherein the user input is a user click on the touchpad in an area that corresponds to the ETA area of the route guidance mode; and
   activate the route overview mode based on the user input.

16. A system for modifying route navigation with waypoints comprising:
   a touchpad including a first touch section and a second touch section;
   a display screen including a first display section and a second display section, wherein said first display section corresponds to said first touch section, and wherein said second display section corresponds to said second touch section, wherein the display screen is separate and apart from the touchpad, and wherein one or more virtual buttons are simulated on the touchpad by vibrating the touchpad to provide haptic feedback to a user in response to the user contacting the touchpad; and
   a computer device comprising at least one processor in communication with at least one memory device, wherein said computer device is in communication with said touchpad and said display screen, and wherein said computer device is programmed to:
   activate an edit mode from a route overview mode;
   display a list of a plurality of destinations on the display screen, wherein the locations of the one or more virtual buttons on the touchpad correspond to positions of the plurality of destinations on the display screen;
   detect a first user input on the touchpad in an area that corresponds to a destination of the plurality of destinations on the list to select the destination, wherein the user discontinues contact with the touchpad;
   display a first indicator positioned adjacent to the selected destination to indicate selection;
   detect a second user input on the touchpad in an area that corresponds to a position in the list;
   display a second indicator between two adjacent destinations to indicate the position on the list representing a current position where the user is in contact with the touchpad, wherein the first indicator and the second indicator are simultaneously displayed with the first indicator positioned adjacent to the selected destination and the second indicator between the two adjacent destinations; and
   move the destination to the position in the list when the user discontinues contact with the touchpad subsequent to the second user input.

17. The method in accordance with claim 5 further comprising:
   displaying the list in the first display section; and
   displaying a plurality of waypoints and route segments based on the list in the second display section.

18. The method in accordance with claim 5, wherein the display screen is positioned in a dashboard of a vehicle and the touchpad is positioned in a center console of the vehicle.

\* \* \* \* \*